June 24, 1952  R. M. WITT  2,601,578
VALVE CONSTRUCTION
Filed Oct. 6, 1945  2 SHEETS—SHEET 2
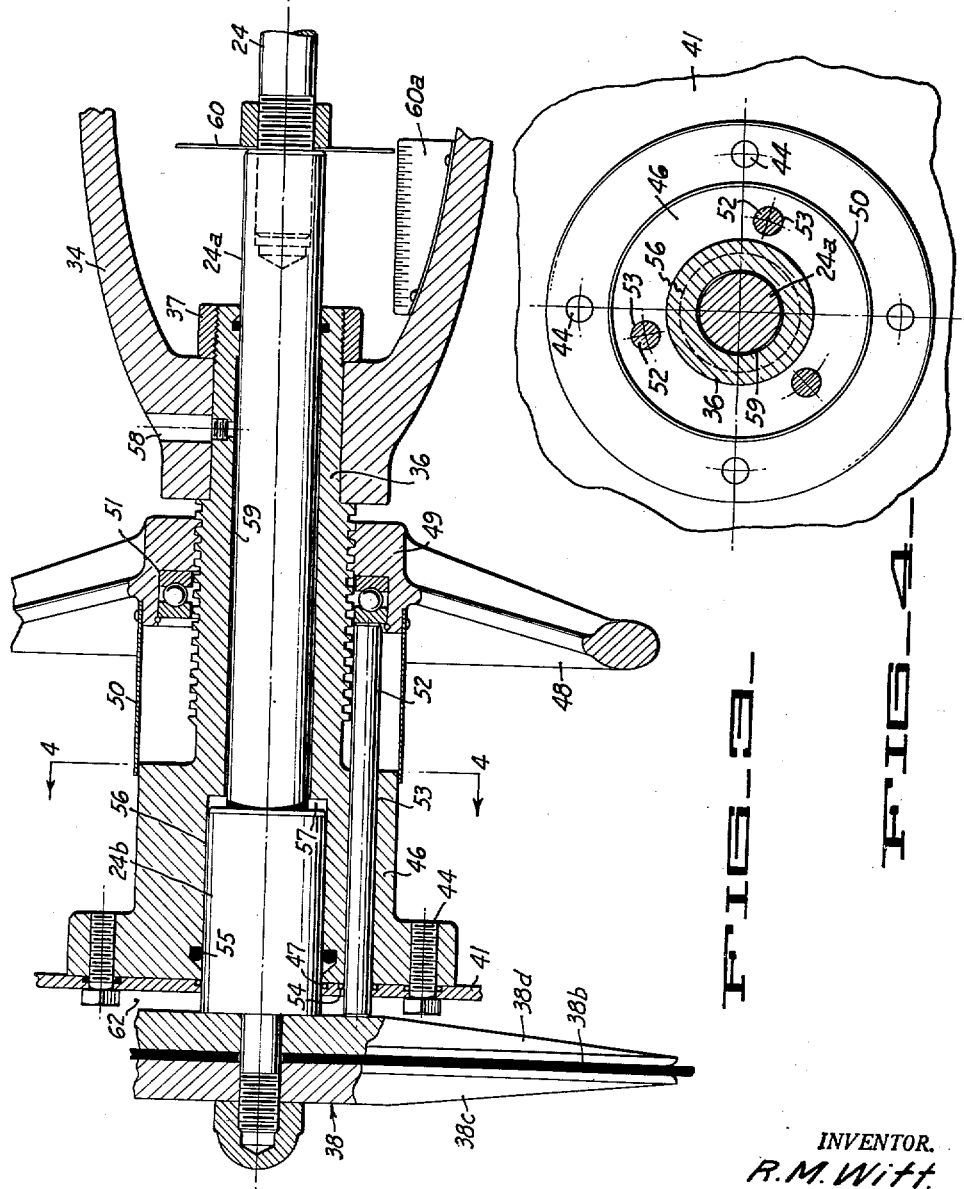
INVENTOR.
R. M. Witt
BY
Paul D. Feiher
ATTORNEY.

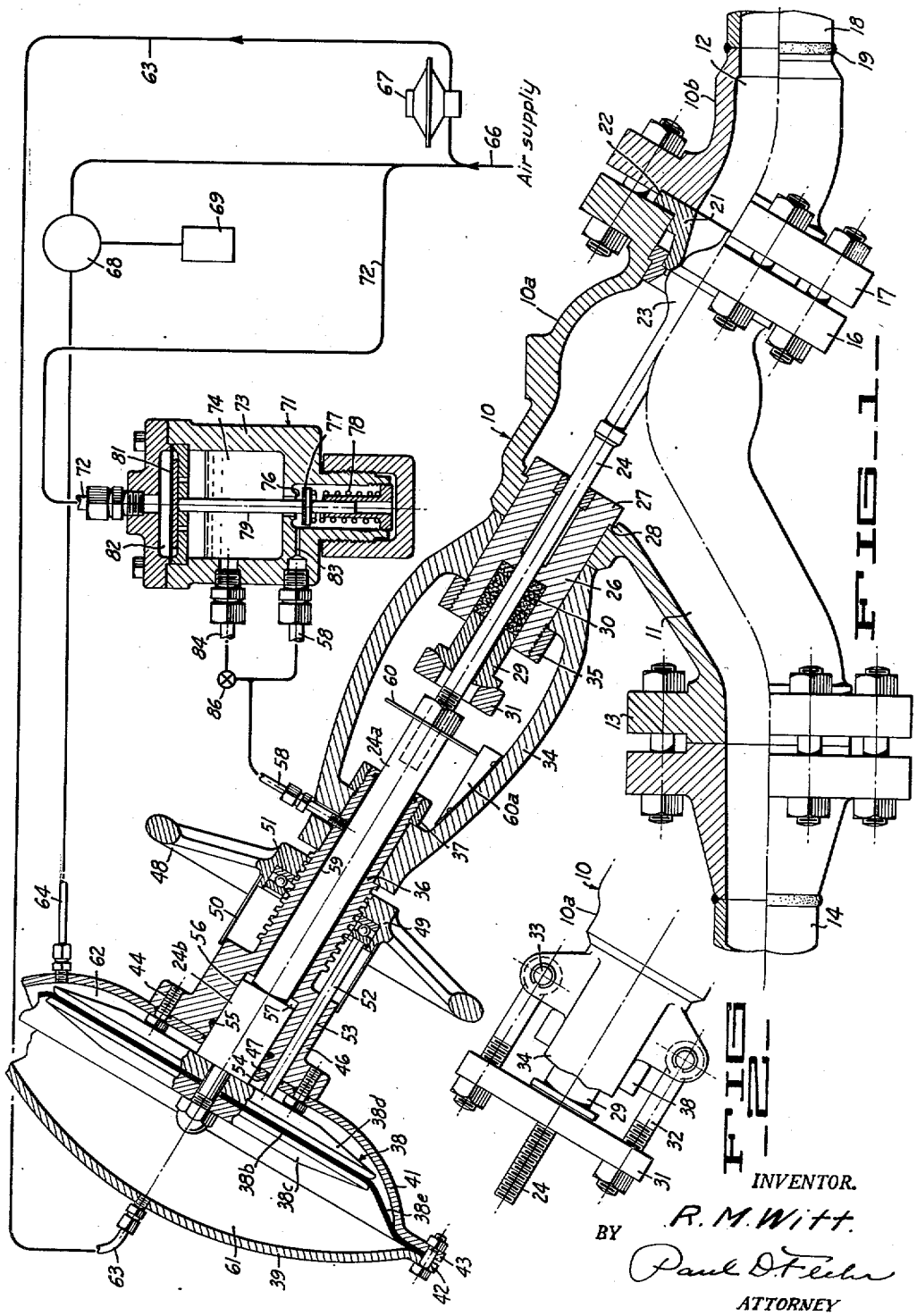

Patented June 24, 1952

2,601,578

UNITED STATES PATENT OFFICE 2,601,578

VALVE CONSTRUCTION

Richard M. Witt, San Francisco, Calif., assignor, by mesne assignments, to M & J Engineering Co., a partnership Application October 6, 1945, Serial No. 620,771

4 Claims. (Cl. 137—139)

This invention relates generally to valves of the type provided with a diaphragm for operation of the same.

In many industrial applications it is common to use diaphragm or motor operated valves for controlling flow of various fluids. Generally the control of such valves is from a remote point and may be either automatic as by means of a temperature responsive device or like instrument, or manually as by means of a manually operated pilot valve. In any event it is customary to load the diaphragm or the movable valve member by means of a loading spring, with pneumatic pressure being applied to the diaphragm to move the same between limiting positions corresponding to open and closed positions of the valve member. For relatively accurate control of the valve member a pneumatic valve positioner is used in conjunction with the control instrument, whereby the valve member is positioned in a predetermined manner as determined by control variations.

When using motor valves with pneumatic control systems as described above, a failure of air supply to the pneumatic control system results in movement of the valve member to full open position under the action of the loading spring. In order to enable emergency closing of the valve under such conditions, it is customary to provide a jacking means on the valve stem which can be operated manually to oppose and compress the loading spring to move the valve member to closed or to a desired intermediate position. Such jacking devices are difficult to operate, particularly because they must be constructed and operated in such a manner as to oppose the relatively heavy forces of the loading spring. In addition their design has been such that they operated upon an exposed portion of the valve rod extending from the valve body, to the mounting of the diaphragm. In addition to these disadvantages such an arrangement involves movement of the valve member to a limiting position upon failure of the air supply, whereas in many instances it would be preferable to have the valve member remain in the position which it occupied at the time of the air failure.

It is an object of the present invention to provide a new diaphragm operated valve having novel means for manually jacking the same toward one limiting position of the valve member.

A further object of the invention is to provide a diaphragm operated valve having novel locking means which is operated upon failure of the air supply to lock the valve member in the position which it occupied at the time of the failure.

A further object of the invention is to provide a valve of the above character which avoids application of jacking means to an exposed portion of the valve rod.

Another object is to provide means for locking the valve in a position which it occupied at the time of failure of the air supply, with further provision for manual controlled movement from such position when it is desired to open or close the valve after such failure.

Additional objects and features of the invention will be disclosed in the following description in which the preferred embodiment of the invention has been set forth in detail in conjunction with the accompanying drawing.

Referring to the drawing:

Figure 1 is a side elevational view, partly in cross section, illustrating apparatus incorporating the present invention.

Figure 2 is a detail illustrating the packing gland and clamping means for the same incorporated in the apparatus of Figure 1.

Figure 3 is an enlarged detail in section illustrating particularly the means for jacking the operating rod of the valve.

Figure 4 is an enlarged cross sectional detail taken along the line 4—4 of Figure 3.

The embodiment of the valve illustrated consists generally of the body 10 provided with the inflow and outflow passages 11 and 12. The main portion 10a of the body is provided with a flange 13 surrounding the inflow passage 11 for coupling to the piping 14. Also the body part 10a has a flange 16 for coupling with a flange 17 and the body part 10b. This body part can be connected with outflow piping 18 as by means of weld connection 19.

An annular seat ring 21 is disposed within the body and has a flange 22 clamped between the coupling flanges 16, 17. This seating sleeve is engaged by the valve member 23, which is attached to the inner end of a valve operating stem 24. A suitable head or bonnet 26 is attached to the body part 10a, and is bored to receive the stem 24. While in some instances the bonnet may be secured to the body part 10a by means such as a threaded connection, weld connection, or made integral therewith, in this instance the bonnet is detachable and is provided with an inner enlarged portion 27 which engages and seals upon an annular shoulder 28 formed within the body. The bonnet 26 is provided with packing 30 to seal about the stem 24 and this packing is compressed by follower 29 which in turn is engaged by the follower clamp bar 31. The ends of this bar are engaged by the bolts 32 which are attached by pivot pins 33 to the body of the valve.

The bonnet 26 serves to mount a yoke 34, and these parts are rigidly clamped together by nut 35. The outer end of the yoke is bored to receive the adjacent end of a sleeve 36, which is fixed to the yoke as by clamping nut 37. An enlarged extension 24a of the valve stem fits slidably within the sleeve 36, and is operatively connected to the diaphragm 38.

The diaphragm assembly employed can consist of the sheet 38b of flexible material such as rubber or impregnated fabric, in conjunction with a circularly contoured diaphragm plate 38c, 38d. The mounting means for this diaphragm assembly includes the upper and lower dished parts 39, 41 having peripheral annular flanges 42, 43 between which the peripheral margin of the diaphragm 38b is clamped. The proportioning is such that the diaphragm assembly provides an annular flexible portion 38e between the diaphragm plates and the flanges 42, 43.

The lower part 41 of the diaphragm mounting is secured, as by means of screws 44, to the flanged end 46 of the sleeve 36. Suitable means such as the sealing ring 47 is provided to seal between these parts.

To provide manually operated means for jacking the valve stem in a direction outwardly with respect to the valve body, that is toward full open position, a hand wheel 48 is provided, which has a hub 49 threaded upon the sleeve 36. The outer face of hub 49 is recessed to receive a ball bearing assembly 51, the upper face of which forms a platform or abutment for engaging the lower ends of the thrust rods 52. The enlarged end portion 46 of sleeve 36 is provided with circumferentially spaced drilled openings 53, to accommodate the thrust rods 52. The thrust rods are arranged parallel to each other and to stem portion 24a, and they are equally spaced apart in a circumferential direction about the axis of the valve stem. While the number of these rods may vary three have been shown in the drawing. The remote or outer ends of rods 52 are adapted to be in abutting engagement with the adjacent face of the diaphragm plate 38d. Suitable means is provided for sealing about the thrust rods 52, as for example the provision of recesses to receive the O rings 54. The portions of rods 52 adjacent the hand wheel, which would otherwise be exposed, are preferably protected by means of the tubular shroud 50, which is carried by the hand wheel hub 49. This shroud is slidable with respect to the cylindrical portion 46 of the sleeve 36. It will be evident that upon turning the hand wheel 48 in a direction to traverse the same toward the diaphragm mounting, rods 52 contact and move the diaphragm assembly to thereby move the valve stem toward limiting open position.

To provide means for automatically locking the valve stem in a given operating position, that end of the stem adjacent the diaphragm assembly is provided with a cylindrical enlargement 24b. This portion acts as a piston and is fitted within a cylindrical bore 56 in the sleeve portion 46. Leakage about portion 24b is prevented by suitable means such as the rubber O ring packing 55. The closed space 57 at one end of the piston is normally filled with liquid such as oil, and is in communication with a pipe 58 through space 59. Assuming that flow of liquid through pipe 58 is interrupted the remaining trapped liquid in space 57 prevents movement of the the valve stem towards closed position.

Means are provided for visually indicating the position of the valve rod and the main valve member. Thus the valve rod carries a disc 60, and edge of which is adjacent a vertical graduated strip 60a.

In operating the apparatus described above it is desirable to apply a substantially constant air or gas pressure to the space 61 above the diaphragm and to apply various pressures to the space 62 below the diaphragm in order to thereby move the diaphragm to various operating positions. In Figure 1 passages 63 and 64 are shown connected with the spaces 61 and 62 and lead to other elements of a pneumatic control system. Thus in this instance the pneumatic control system includes the air supply pipe 66, pressure reducing valve 67, valve positioner 68 and instrument control 69. The pressure reducing regulator 67 serves to supply air to pipe line 63 at a desired regulated pressure to provide a desired loading force upon the diaphragm. Pipe 66 also supplies air to the valve positioner 68 and this positioner is connected to the pipe line 64 leading to the chamber 62 below the diaphragm. The positioner 68 also has a pneumatic connection with the instrument control device 69, which in a typical instance may be a temperature responsive device adapted to vent varying amounts of air dependent upon the temperature of an object or heat receiving zone. Valve positioner 68 may vary in construction but may for example correspond to the valve positioner disclosed in Patent No. 2,312,301, and is provided with a suitable mechanical motion transmitting connection to either the valve rod or the diaphragm.

In addition to the parts of the pneumatic control system described above it is desirable to provide a pneumatically operated locking valve 71 which has a pipe connection 72 to the pneumatic supply pipe 66, and also a connection to the pipe line 58. Device 71 can be formed substantially as illustrated and consists in this instance of a valve body 73 provided with an oil reservoir 74. There is also a valve seat 76 with which the movable valve member 77 cooperates. Compression spring 78 urges the valve member towards closed position. The valve stem 79 is operatively connected to the flexible diaphragm 81. The space 82 above this diaphragm is in communication with pipe line 72 leading to the air supply pipe 66. The space below the valve member 77 is in communication with duct 83 with which the pipe 58 communicates. A by-pass line 84 connects between line 58 and the reservoir 74, and is provided with a manually operated valve 86.

While normal pressure is maintained in the supply pipe 66, sufficient pressure is applied to diaphragm 81 to retain the valve 77 open. Therefore during normal movements of the main valve and particularly of the cylindrical portion 24b, oil is free to surge through line 58 to supply or withdraw oil from reservoir 74. In the event of a failure of the air supply the pressure applied to the diaphragm drops sufficiently to cause valve 77 to close under the urge of spring 78, and as a result oil in space 57 is trapped to thereby lock the valve stem against movement towards closed position. In other words the main valve is locked in substantially the position which it occupied at the time of an air supply failure. Thereafter if one desires to permit movement of the main valve to closed position, by-pass valve 86 is opened to permit flow of the trapped oil into the reservoir 74 with the result that residual pressure in space 61 and/or inflow pressure acting upon the valve member 23, forces the main valve member to closed position. Assuming however that it is desired to move the main valve member towards open position, hand wheel 48 is operated to move thrust rods 52 upwardly whereby the diaphragm assembly is moved upwardly to translate the valve member to its desired adjusted position. While so adjusting the position of the main valve member it is desirable to open the by-pass valve 86 to permit flow of oil from the reservoir 74 into the space 57.

I claim:

1. In fluid pressure operated apparatus, valve means comprising a valve body and a valve member within the body movable in opposite directions between open and closed positions, a valve rod attached to the valve member and extending to the exterior of the body, and a fluid pressure operated diaphragm having an operative connection with the exterior end of the valve rod, mounting means for said diaphragm including means forming gas chambers upon opposite sides of the diaphragm, that chamber remote from the valve body being adapted to receive a substantially constant gas pressure to provide a substantially constant loading force upon the diaphragm, the other chamber being adapted to receive gas at varying pressures to thereby cause movement of the diaphragm with consequent corresponding movement of the valve rod and valve member, mechanical means interposed between the diaphragm mounting and the valve member for moving the diaphragm in a direction away from the valve member, and hydraulic means operative to lock movement of the valve rod in a direction towards the valve body.

2. In fluid pressure operated apparatus as in claim 1 in which said hydraulic locking means is operative responsive to a failure of the gas supply to said chambers.

3. In a fluid pressure operated valve of the type including a valve member attached to one end of a valve rod and operating within a valve body, the other end of the rod being attached to a fluid pressure operated diaphragm which is housed within a diaphragm mounting, the mounting being connected to the valve body by a tubular member which encloses the valve rod; the combination with said valve of a manually operable member disposed between the diaphragm mounting and the valve body and rotatable about an axis concentric with the axis of the valve operating rod, and means including elements extending from said manually operable member into said diaphragm mounting and serving to apply mechanical thrust to the diaphragm upon turning said manually operable member in one direction.

4. In a fluid pressure operated valve of the type including a valve member attached to one end of a valve rod and operating within a valve body, the other end of the rod being attached to a fluid operated diaphragm which is housed within a diaphragm mounting, the mounting being connected to the valve body by a tubular member which encloses the valve rod, the mounting forming a fluid chamber adapted to receive varying fluid pressures and located on that side of the diaphragm faced toward the valve body; the combination with such valve of a manually operable member rotatable about an axis aligned with the axis of the valve rod, a threaded engagement between said rotatable member and the tubular member, and thrust transmitting members interposed between said manually operable member and the adjacent side of the diaphragm, said last named members extending into said fluid chamber and serving to transmit motion to the diaphragm and the valve rod upon turning said manually operable member in one direction.

RICHARD M. WITT.

REFERENCES CITED

The following references are of record in the file of this patent:

UNITED STATES PATENTS

| Number | Name | Date |
|---|---|---|
| 623,934 | Wilson | Apr. 25, 1899 |
| 1,204,687 | Roder | Nov. 14, 1916 |
| 1,888,392 | Penick | Nov. 22, 1932 |
| 2,277,075 | Dahl | Mar. 24, 1942 |
| 2,339,469 | Emanuel | Jan. 18, 1944 |

FOREIGN PATENTS

| Number | Country | Date |
|---|---|---|
| 251,392 | Great Britain | of 1926 |
| 450,190 | Great Britain | of 1936 |